US008861641B2

(12) United States Patent
Oka et al.

(10) Patent No.: US 8,861,641 B2
(45) Date of Patent: Oct. 14, 2014

(54) WIRELESS COMMUNICATION DEVICE AND WIRELESS COMMUNICATION METHOD

(75) Inventors: Shinya Oka, Yokoshuka (JP); Takashi Okada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 58 days.

(21) Appl. No.: 13/520,941

(22) PCT Filed: Jan. 7, 2011

(86) PCT No.: PCT/JP2011/050198
§ 371 (c)(1),
(2), (4) Date: Aug. 28, 2012

(87) PCT Pub. No.: WO2011/083852
PCT Pub. Date: Jul. 14, 2011

(65) Prior Publication Data
US 2013/0034185 A1 Feb. 7, 2013

(30) Foreign Application Priority Data
Jan. 8, 2010 (JP) ................................ 2010-003033

(51) Int. Cl.
*H04L 25/06* (2006.01)
*H04B 1/04* (2006.01)
(52) U.S. Cl.
CPC ................................... *H04B 1/0475* (2013.01)
USPC ........... 375/296; 375/295; 375/259; 375/285; 455/296; 455/114.2; 455/115.1; 455/115.4; 455/118; 455/123; 455/125; 455/126
(58) Field of Classification Search
USPC .................. 375/296, 295, 259, 285; 455/296, 455/114.2, 115.1, 115.4, 118, 123, 125, 126
See application file for complete search history.

(56) References Cited

U.S. PATENT DOCUMENTS

2002/0034262 A1* 3/2002 Citta et al. .................... 375/298
2006/0189283 A1* 8/2006 Tanaka et al. .............. 455/127.1
(Continued)

FOREIGN PATENT DOCUMENTS

EP    1 924 042 A1    5/2008
JP    7 221808        8/1995
(Continued)

OTHER PUBLICATIONS

3GPP TS 36.101, V10.0.0, "3$^{rd}$ Generation Partnership Project; Technical Specification Group Radio Access Network; Evolved Universal Terrestrial Radio Access (E-UTRA); User Equipment (UE) radio transmission and reception," pp. 1-188, (Oct. 2010).

(Continued)

*Primary Examiner* — Siu Lee
(74) *Attorney, Agent, or Firm* — Oblon, Spivak, McClelland, Maier & Neustadt, L.L.P.

(57) ABSTRACT

A wireless communication device includes a mixer that multiplies quadrature-modulated transmission data by a local oscillation frequency signal and outputs a high-frequency signal; a distributor that distributes the high-frequency signal; a detector circuit that detects a direct current component included in the high-frequency signal, based on the high-frequency signal distributed by the distributor; a correction signal generating unit that generates a correction signal for removing the direct current component from the high-frequency signal, based on the direct current component detected by the detector circuit; a correction unit that corrects the high-frequency signal by the correction signal generated by the correction signal generating unit; and a transmission unit that transmits the high-frequency signal that has been corrected by the correction unit.

5 Claims, 11 Drawing Sheets

(56) References Cited

U.S. PATENT DOCUMENTS

2007/0281655 A1 * 12/2007 Ishikawa et al. .............. 455/296
2009/0213960 A1 * 8/2009 Ikeda et al. .................. 375/296

FOREIGN PATENT DOCUMENTS

| JP | 2000 174833 | 6/2000 |
| JP | 2002-77285 | 3/2002 |
| JP | 2002 271292 | 9/2002 |
| JP | 2007 311839 | 11/2007 |

OTHER PUBLICATIONS

International Search Report Issued Feb. 15, 2011 in PCT/JP11/50198 Filed Jan. 7, 2011.
Extended Search Report issued May 12, 2014 in European Patent Application No. 11731850.1.

* cited by examiner

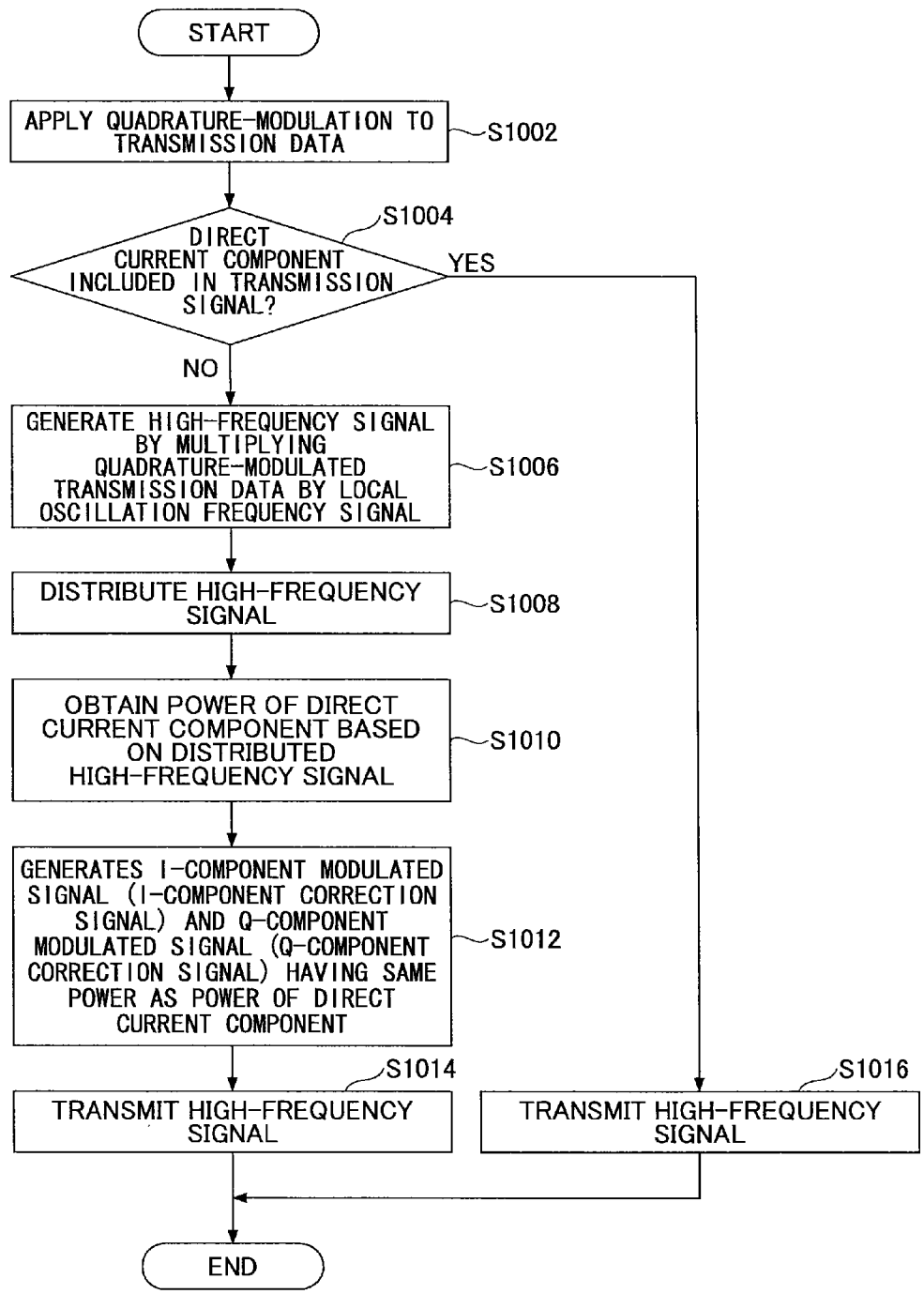

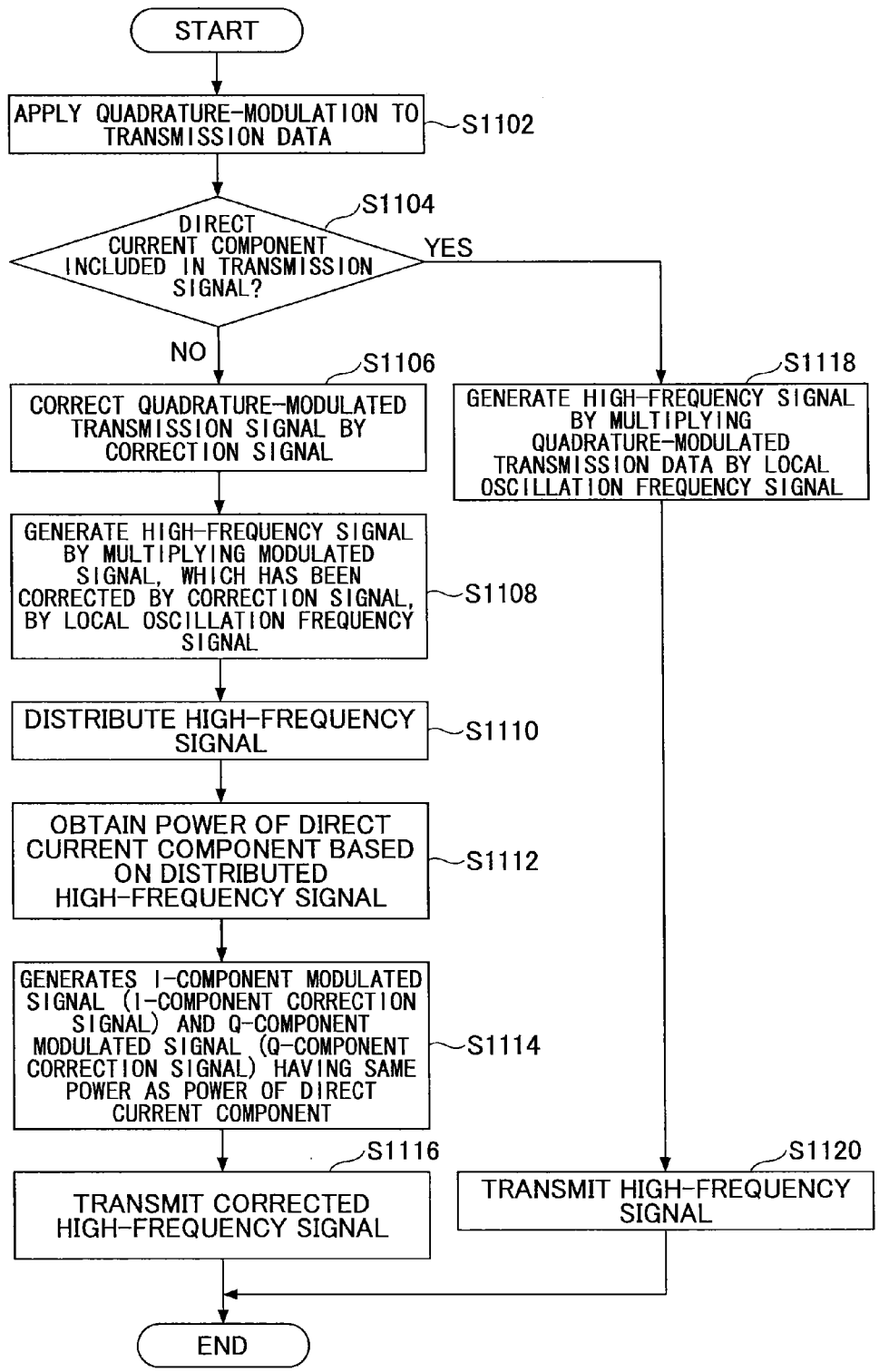

WIRELESS COMMUNICATION DEVICE AND WIRELESS COMMUNICATION METHOD

TECHNICAL FIELD

The present invention relates to a wireless communication device.

BACKGROUND ART

A wireless device, in which the orthogonal frequency division multiplexing (OFDM) method and/or a single carrier (SC) frequency division multiple access method has been adopted, utilizes a frequency band formed by bundling plural subcarriers as a unit for wireless communications. The unit is also called "a resource block."

Since the wireless device performs wireless communications by using the frequency band formed by bundling the plural subcarriers as the unit, it is possible that the wireless device performs wireless communications by utilizing partial subcarriers in an assigned system bandwidth, depending on a traffic volume to be transmitted or quality of communication channels. In other words, the wireless device may perform wireless transmission by using subcarriers included in a portion of the resource blocks included in the system bandwidth, not by utilizing all the subcarriers included in the assigned system bandwidth.

FIGS. 1A and 1B show examples of assigned transmission frequency bands for transmission.

FIG. 1A shows a case in which all the available subcarriers included in the system bandwidth are utilized. FIG. 1B shows a case in which a portion of the subcarriers included in a resource block in the system bandwidth is utilized. Specifically, FIG. 1B shows the case in which the subcarriers included in a specific resource block, among resource blocks included in the system bandwidth, are utilized. Here, the specific resource block is located in a lower frequency range with respect to a center frequency of the system bandwidth. Contrary to this, it is possible that the subcarriers included in another resource block, among the resource blocks included in the system bandwidth, are utilized. Here, other resource block is located in a higher frequency range with respect to the center frequency of the system bandwidth.

By utilizing subcarriers included in a portion of resource blocks included in a system bandwidth, radio resources can be flexibly and efficiently assigned to wireless devices having different QoS requirements or different communication environments.

RELATED ART DOCUMENT

Patent Document

Patent document 1: Japanese Laid-Open Patent Application No. 2002-271292

SUMMARY OF THE INVENTION

Problem to be Solved by the Invention

The center frequency of the wireless device for the transmission is invariant, regardless of whether the subcarriers in the lower frequency range are bundled for the transmission or the subcarriers in the higher frequency range are bundled for the transmission. In other words, the center frequency is the same for the case in which the transmission is performed by using a resource block in the lower frequency range in the assigned frequency range, and for the case in which the transmission is performed by using a resource block in the upper frequency range in the assigned frequency range. The center frequency is used as a local oscillation frequency in a mixer. The wireless device applies signal processing to a signal in a baseband, prior to up-converting the signal into a high-frequency signal, so that the subcarriers are bundled in a lower frequency band or in a higher frequency band with respect to the center frequency. The processed signal is up-converted into the high-frequency signal by using the local oscillation frequency, similar to the case of using all the subcarriers. The components of the high-frequency signal include 2 GHz and 800 MHz.

The wireless device includes a quadrature modulator. However, it is possible that signals modulated by the quadrature modulator do not fulfill an ideal orthogonal relationship.

FIG. 2 shows a resultant obtained by combining an in-phase component and a quadrature component of an original signal that has been modulated by the quadrature modulator. In FIG. 2, the frequency component indicated by (1) is the frequency component of a desired signal, the frequency component indicated by (2) is a spurious radiation signal, and the frequency component indicated by (3) is the direct current component.

From FIG. 2, it can be understood that the amplitude of the in-phase component of the signal and the amplitude of the quadrature component of the signal are not the same levels. Further, it can be understood that, at a position which is symmetric to the position of the frequency component of the desired signal with respect to 0 Hz, the spurious radiation signal is generated, and additionally the direct current component is generated. The spurious radiation component and the direct current component are generated, because the phase difference between the in-phase component and the quadrature component is shifted from 90 degrees.

The direct current component and the spurious radiation component can cause interferences with other devices that utilize the frequency range of the direct current component and the spurious radiation signal as frequencies of desired signals. Further, when the direct current component and the spurious radiation signal pass though a non-linear device in the wireless device, intermodulations are generated by the desired signal, the direct current component, and the spurious radiation signal. When the intermodulations occur, the intermodulations generate spurious radiation components in a wider range. The non-linear device includes a transmission amplifier.

The present invention has been developed in view of the above problems. An objective of the present invention is to provide a wireless communication device and a wireless communication method that can reduce a direct current component in a transmission signal.

Means for Solving the Problem

A wireless communication device according to one embodiment of the present invention includes:
a mixer that multiplies quadrature-modulated transmission data by a local oscillation frequency signal and outputs the high-frequency signal;
a distributor that distributes the high-frequency signal;
a detector circuit that detects a direct current component included in the high-frequency signal, based on the high-frequency signal distributed by the distributor;
a correction signal generating unit that generates a correction signal for removing the direct current component from the high-frequency signal, based on the direct current component detected by the detector circuit;

a correction unit that corrects the high-frequency signal by the correction signal generated by the correction signal generating unit; and a transmission unit that transmits the high-frequency signal that has been corrected by the correction unit.

A wireless communication method according to one embodiment includes:

a high-frequency signal generating step of generating a high-frequency signal by multiplying quadrature-modulated transmission data by a local oscillation frequency signal;

a distribution step of distributing the high-frequency signal;

a detection step of detecting a direct current component included in the high-frequency signal, based on the high-frequency signal distributed by the distribution step;

a correction signal generating step of generating a correction signal for removing the direct current component from the high-frequency signal, based on the direct current component detected by the detection step;

a correction step of correcting the high-frequency signal by the correction signal generated by the correction signal generating step; and a transmission step of transmitting the high-frequency signal that has been corrected by the correction step.

Effect of Present Invention

According to the disclosed wireless communication device and the wireless communication method, the direct current component can be reduced in the transmission signal.

BRIEF DESCRIPTION OF THE DRAWINGS

FIG. 10 is a flowchart (version 1) showing an operation of the wireless communication device according to one embodiment;

FIG. 11 is a flowchart (version 2) showing an operation of the wireless communication device according to one embodiment.

EMBODIMENTS FOR CARRYING OUT THE INVENTION

Figure 1A:
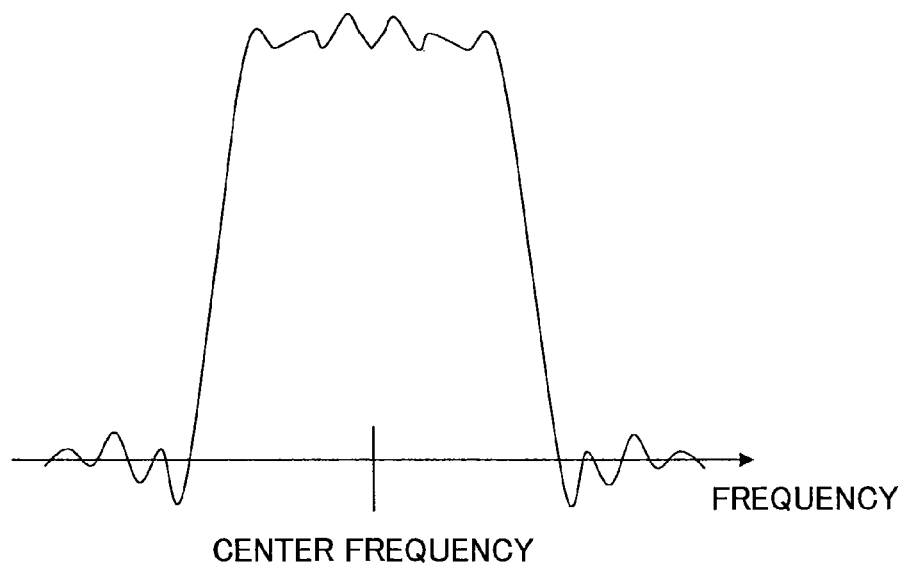
FIG. 1A is a diagram illustrating an example of an assignment of a frequency band for transmission to a wireless device.
Figure 1B:
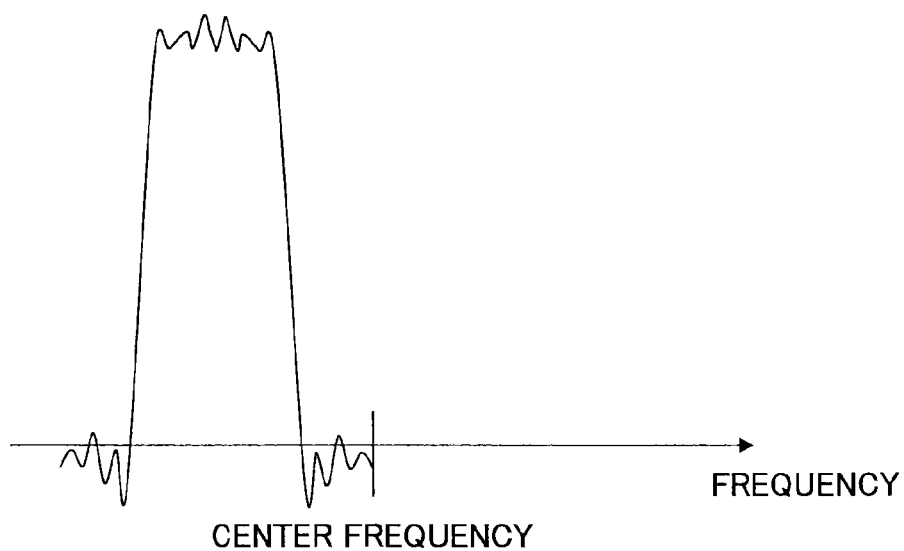
FIG. 1B is a diagram illustrating an example of an assignment of a frequency band for transmission to a wireless device.
Figure 2:
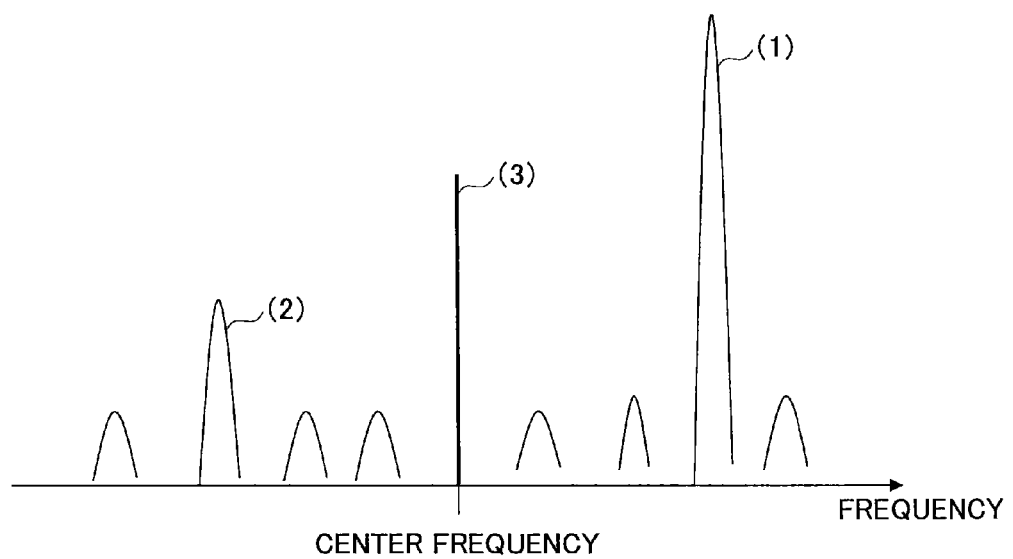
FIG. 2 is a diagram illustrating an in-phase component and a quadrature component of a signal modulated by a quadrature modulator.

Next, embodiments for implementing the present invention are explained while referring to the drawings. Throughout the drawings illustrating the embodiments, the same reference numerals are attached to those having the same functions, and descriptions thereof are not repeated.

<Wireless Communication Device>

Figure 3:
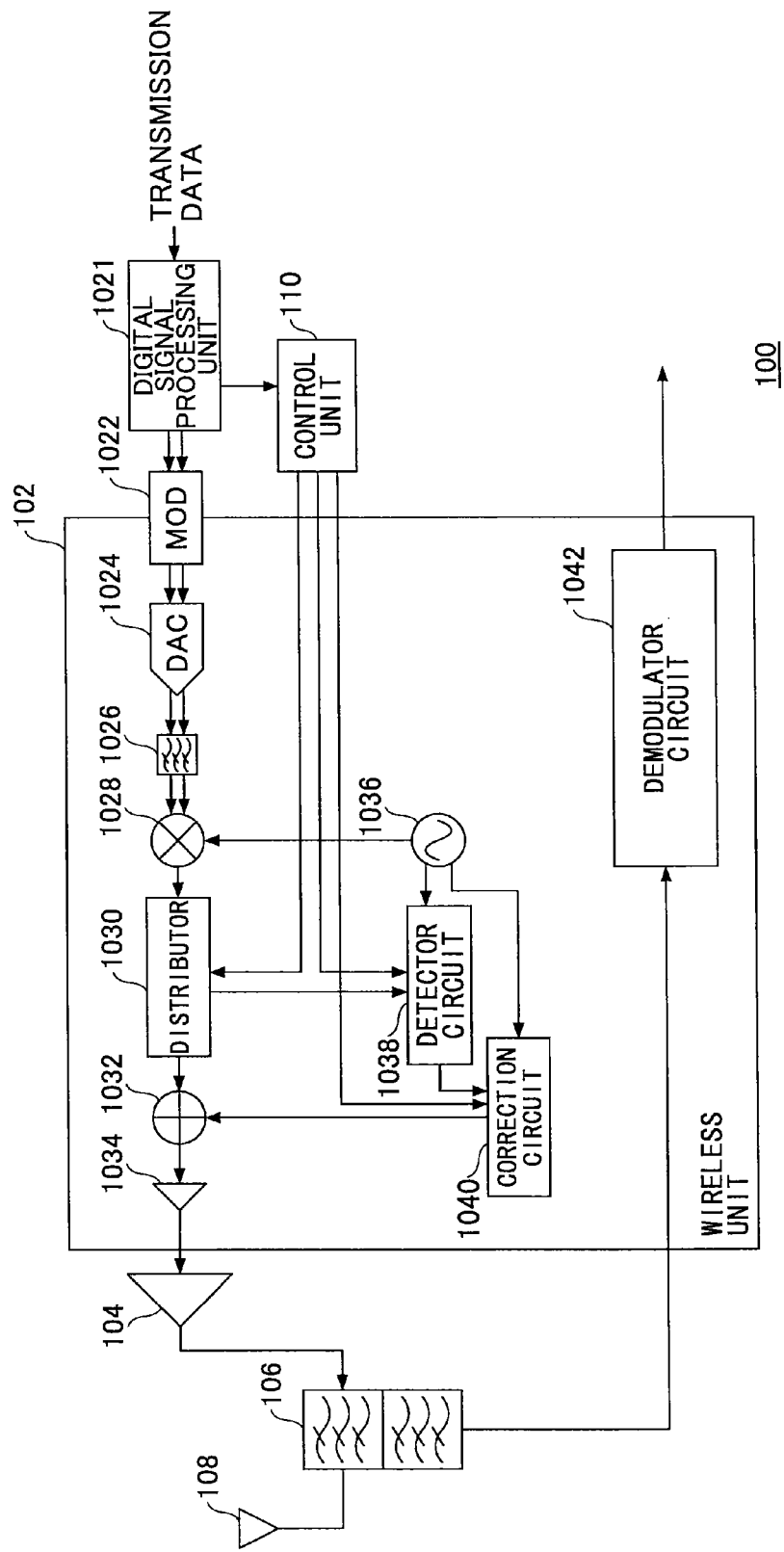
FIG. 3 is a functional block diagram showing functional blocks of a wireless communication device according to one embodiment.

FIG. 3 shows a wireless communication device 100 according to an embodiment. FIG. 3 mainly illustrates a configuration of a wireless unit.

The wireless communication device 100 may be included in a portable terminal device or in a portable information terminal (Personal Digital Assistant (PDA)). Alternatively, the wireless communication device 100 may be included in a base station device. The wireless communication device 100 performs wireless transmissions, for example, based on the orthogonal frequency division multiplexing method (OFDM) or a single carrier (SC) frequency division multiple access method (FDMA). The wireless communication methods are not limited to the above wireless communication methods, and the embodiment may be applied to a device that performs wireless communications by using a frequency band separated from a center frequency may be utilized for the wireless communication device 100. For example, the embodiment may be applied to a wireless communication device for which Bluetooth (BT) is adopted.

The wireless communication device 100 distributes a signal which is formed by converting a frequency of a quadrature modulated signal into a radio frequency. The output signal to be distributed is formed by digital-to-analog converting of the output signal from a quadrature modulator and subsequently converting the digital-to-analog converted output signal into a radio-frequency signal. The wireless communication device 100 detects a direct current component from the distributed radio-frequency signal by using a local oscillation signal. The direct current component may include the power and the phase of the direct component. The wireless communication device 100 generates a correction signal for removing the direct current component from the signal, whose frequency has been converted into the radio frequency, based on the direct component. For example, the wireless communication device 100 generates a sine wave that has the same frequency as that of the local oscillation signal and has the same power and the opposite phase as that of the direct current component using the local oscillation signal. The wireless communication device 100 corrects the signal, whose frequency has been converted into the radio frequency, by the correction signal. The wireless communication device 100 removes the direct current component by correcting the signal, whose frequency has been converted into the radio frequency, based on the correction signal.

The wireless communication device 100 includes a digital signal processing unit 1021. Transmission data is input to the digital signal processing unit 1021. The transmission data may include a digital signal. The transmission data may be input as an information bit sequence. The digital signal processing unit 1021 performs an error correction coding process or the like. For example, the digital signal processing unit 1021 may perform a convolution coding process, an interleaving process, a mapping process, and an OFDM frame configuration process. The digital signal processing unit 1021 inputs an in-phase (I) component of a digital signal and a quadrature (Q) component of the digital signal, which have been generated by digital signal processing, into a modulator (MOD). Further, the digital signal processing unit 1021 inputs a direct current component of a transmission signal into a control unit 110. The direct current component may be a direct current component generated during the digital signal processing, or it may be a direct current component calculated by averaging the transmission signal.

The wireless communication device 100 includes a modulator 1022. The modulator 1022 is connected to the digital signal processing unit 1021. The transmission data may include the in-phase component (I) and the quadrature (Q) component of the digital signal. The modulator 1022 applies the quadrature modulation to the transmission data, and outputs the modulated signal. The modulator 1022 applies the quadrature modulation to the I-component of the digital signal and the Q-component of the digital signal, and outputs an in-phase component (I) modulated signal and a quadrature phase component (Q) modulated signal. In other words, the modulator 1022 collectively applies an inverse Fourier transform to the transmission data on an OFDM symbol-by-OFDM symbol basis, and thereby generates a baseband OFDM signal in the time domain. The I-component modulated signal and the Q-component modulated signals are input to a digital-to-analog converter (DAC) 1024.

The wireless communication device 100 includes the digital-to-analog converter 1024. The digital-to-analog converter 1024 is connected to the modulator 1022. The digital-to-analog converter 1024 converts the I-component modulated signal and the Q-component modulated signal input by the modulator 1022 into analog signals. The digital-to-analog convertor 1024 inputs the I-component modulated signal converted into the analog signal (hereinafter, it is referred to as the "I-component analog signal") and the Q-component modulated signal converted into the analog signal (hereinafter, it is referred to as the "Q-component analog signal") into a filter 1026.

The wireless communication device 100 includes the filter 1026. The filter 1026 is connected to the digital-to-analog converter 1024. The filter 1026 applies bandwidth limitation to the I-component analog signal and the Q-component analog signal input from the digital-to-analog converter 1024, and removes unnecessary frequency components. For example, the filter 1026 may cause only the signals having frequencies less than or equal to a predetermined frequency band to be transmitted. The bandwidth-limited I-component analog signal and Q-component analog signals are input into a mixer 1028.

The wireless communication device 100 includes the mixer 1028. The mixer 1028 is connected to the filter 1026. The mixer 1028 multiplies the input signals from the filter 1026 by a local oscillation frequency signal input from a local oscillator 1036. In other words, the mixer 1028 converts (up-converts) the input signals from the filter 1026 into radio-frequency signals.

Figure 4:
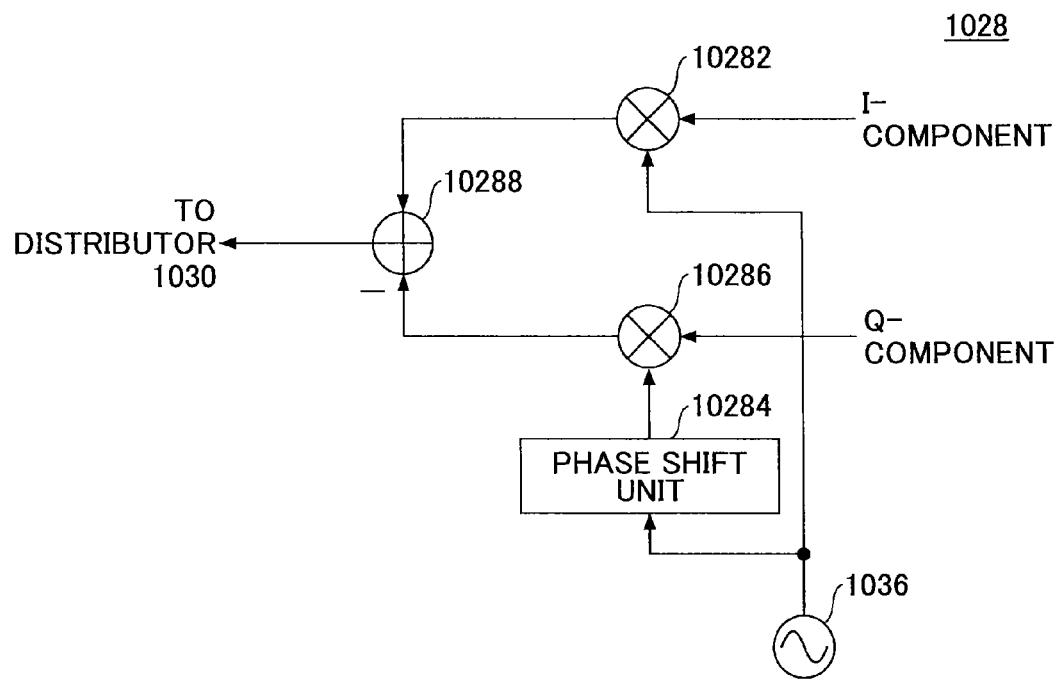
FIG. 4 is a functional block diagram showing a mixer of the wireless communication device according to one embodiment.

FIG. 4 shows details of the mixer 1028.

The mixer 1028 includes a multiplication unit 10282. The multiplication unit 10282 is connected to the filter 1026. The filter 1026 inputs the bandwidth-limited I-component analog signal to the multiplication unit 10282. The multiplication unit 10282 multiplies the band-limited I-component analog signal by the local oscillation frequency signal input from the local oscillator 1036. The multiplication unit 10282 inputs the bandwidth-limited I-component analog signal, which has been multiplied by the local oscillation frequency signal, to an adder 10288.

The mixer 1028 includes a phase shift unit 10284. The phase shift unit 10284 is connected to the local oscillator 1036. The local oscillator 1036 inputs the local oscillation frequency signal to the phase shift unit 10284. The phase shift unit 10284 generates a local oscillation frequency signal, whose phase is shifted by 90 degrees from the phase of the local oscillation frequency signal. The local oscillation frequency signal is input to a multiplication unit 10286.

The mixer 1028 includes the multiplication unit 10286. The multiplication unit 10286 is connected to the filter 1026 and to the phase shift unit 10284. The filter 1026 inputs the bandwidth-limited Q-component analog signal to the multiplication unit 10286. The multiplication unit 10286 multiplies the bandwidth-limited Q-component analog signal by the local oscillation frequency signal input from the phase shift unit 10284. The second multiplication unit 10286 inputs the bandwidth-limited Q-component analog signal, with has been multiplied by the local oscillation frequency signal, to the adder 10288.

The mixer 1028 includes the adder 10288. The adder 10288 is connected to the multiplication unit 10282 and to the multiplication unit 10286. The adder 10288 subtracts the bandwidth-limited Q-component analog signal, which has been multiplied by the local oscillation frequency signal, input from the multiplication unit 10286, from the bandwidth-limited I-component analog signal, which has been multiplied by the local oscillation frequency signal, input from the multiplication unit 10282. Hereinafter, the signal formed by subtracting the bandwidth-limited Q-component analog signal, which has been multiplied by the local oscillation frequency signal, from the bandwidth-limited I-component analog signal, which has been multiplied by the first local oscillation frequency signal, is referred to as a "high-frequency signal." The adder 20288 inputs a high-frequency signal to a distributor 1030.

The wireless communication device 100 includes the distributor 1030. The distributor 1030 is connected to the mixer 1028. The distributor 1030 distributes the high-frequency signal as plural signals. For example, the distributor 1030 distributes the high-frequency signal input from the mixer 1028 as two signals. The distributed two high-frequency signals are input to the adder 1032 and to a detector circuit 1038.

The wireless communication device 100 includes the detector circuit 1038. The detector circuit 1038 is connected to the distributor 1030. The high-frequency signal is input to the detector circuit 1038 by the distributor 1030, and the local oscillation frequency signal is input to the detector circuit 1038 by the local oscillator 1036. The detector circuit 1038 detects the power and the phase of the direct current component of the high-frequency signal, based on the local oscillation frequency signal input from the local oscillator 1036. For example, the detector circuit 1038 restores an original signal from the high-frequency signal input by the distributor 1030. Here, the original signal means a signal corresponding to the signals output from the filter 1026. In other words, the detector circuit 1038 down-converts the high-frequency signal. The detector circuit 1038 detects the power and the phase of the direct component of the high-frequency signal, based on the down-converted high-frequency signal.

The direct current component is generated during a time period, in which the mixer 1028 multiplies the modulated signal by the local oscillation frequency signal. The direct current component can be detected by down-converting the high-frequency signal from the mixer 1028 into a modulated signal. The detector circuit 1038 inputs the power and the phase of the direct current component of the high-frequency signal to a correction circuit 1040.

The wireless communication device 100 includes the correction circuit 1040. The correction circuit 1040 is connected to the detector circuit 1038 and to the local oscillator 1036. The correction circuit 1040 generates a sine wave having the same power as that of the direct current component, having a phase that is opposite to the phase of the direct component, and having the same frequency as that of the local oscillation frequency signal, based on the power and the phase of the direct current component of the high-frequency signal input by the detector circuit 1038. The sine wave is referred to as a "correction signal." The correction circuit 1040 inputs the correction signal to the adder 1032.

The wireless communication device 100 includes the adder 1032. The adder 1032 is connected to the distributor 1030 and to the correction circuit 1040. The adder 1032 adds the correction signal input from the correction circuit 1040 to the high-frequency signal input from the distributor 1030. The correction signal includes a component having the same power as the power of the direct current component in the high-frequency signal and having a phase that is opposite to the phase of the direct current component in the high-frequency signal. The direct current component is removed from the high-frequency signal by this component. The adder 1032 inputs the high-frequency signal from which the direct current component has been removed to an amplifier 1034.

The wireless communication device 100 includes the amplifier 1034. The amplifier 1034 is connected to the adder 1032. The amplifier 1034 amplifies the high-frequency signal input from the adder 1032. For example, the amplifier 1034 amplifies amplitude to a predetermined level. The high-frequency signal, whose amplitude has been amplified to the predetermined level, is input to a power amplifier 104.

The wireless communication device 100 includes the power amplifier 104. The power amplifier 104 is connected to the amplifier 1034. The power amplifier 104 amplifies the high-frequency signal input from the amplifier 1034 to be desired power for wirelessly transmitting the high-frequency signal. The power amplifier 104 inputs the high-frequency signal, which has been power-amplified, to a duplexer 106.

The wireless communication device 100 includes the duplexer 106. The duplexer 106 is connected to the power amplifier 104. The duplexer 106 separates the transmit frequency from the receive frequency, which are input to and/or output from the antenna 108, so that the wireless communication device 100 can simultaneously transmit and receive wireless signals. The duplexer 106 transmits the modulated signal input from the power amplifier 104 through the antenna 108.

The wireless communication device 100 includes the antenna 108. The antenna 108 is connected to the duplexer 106. The antenna 108 receives wireless signals from another wireless device and/or a base station, and inputs the received wireless signals to the duplexer 106. Further, the antenna 108 transmits transmission signals from the duplexer 106 as radio signals.

The wireless communication device 100 includes a demodulator circuit 1042. The demodulator circuit 1042 is connected to the duplexer 106. The demodulator circuit 1042 demodulates signals input from the duplexer 106.

The wireless communication device 100 includes the control unit 110. The control unit 110 is connected to the digital signal processing unit 1021, to the distributor 1030, to the detector circuit 1038, and to the correction circuit 1040. The control unit 110 determines whether the signal transmitted from the wireless communication device 100 includes a direct current component, based on the direct current component input from the digital signal processing unit 1021. When the signal transmitted from the wireless communication device 100 includes the direct current component, the control unit 110 causes the distributor 1030, the detector circuit 1038, and the correction circuit 1040 not to operate. This is because, when the signal transmitted from the wireless communication device 100 includes the direct current component, data is transmitted by the center frequency. By causing the distributor 1030, the detector circuit 1038, and the correction circuit 1040 not to operate when the signal transmitted from the wireless communication device 100 includes the direct current component, power consumption can be reduced.

Further, when the signal transmitted from the wireless communication device 100 does not include the direct current component, the controller 110 causes the distributor 1030, the detector circuit 1038, and the correction circuit 1040 to operate. This is because, when the signal transmitted from the wireless communication device 100 does not include the direct current component, the data is not transmitted by the center frequency.

<Operation of Wireless Device>

Figure 5:
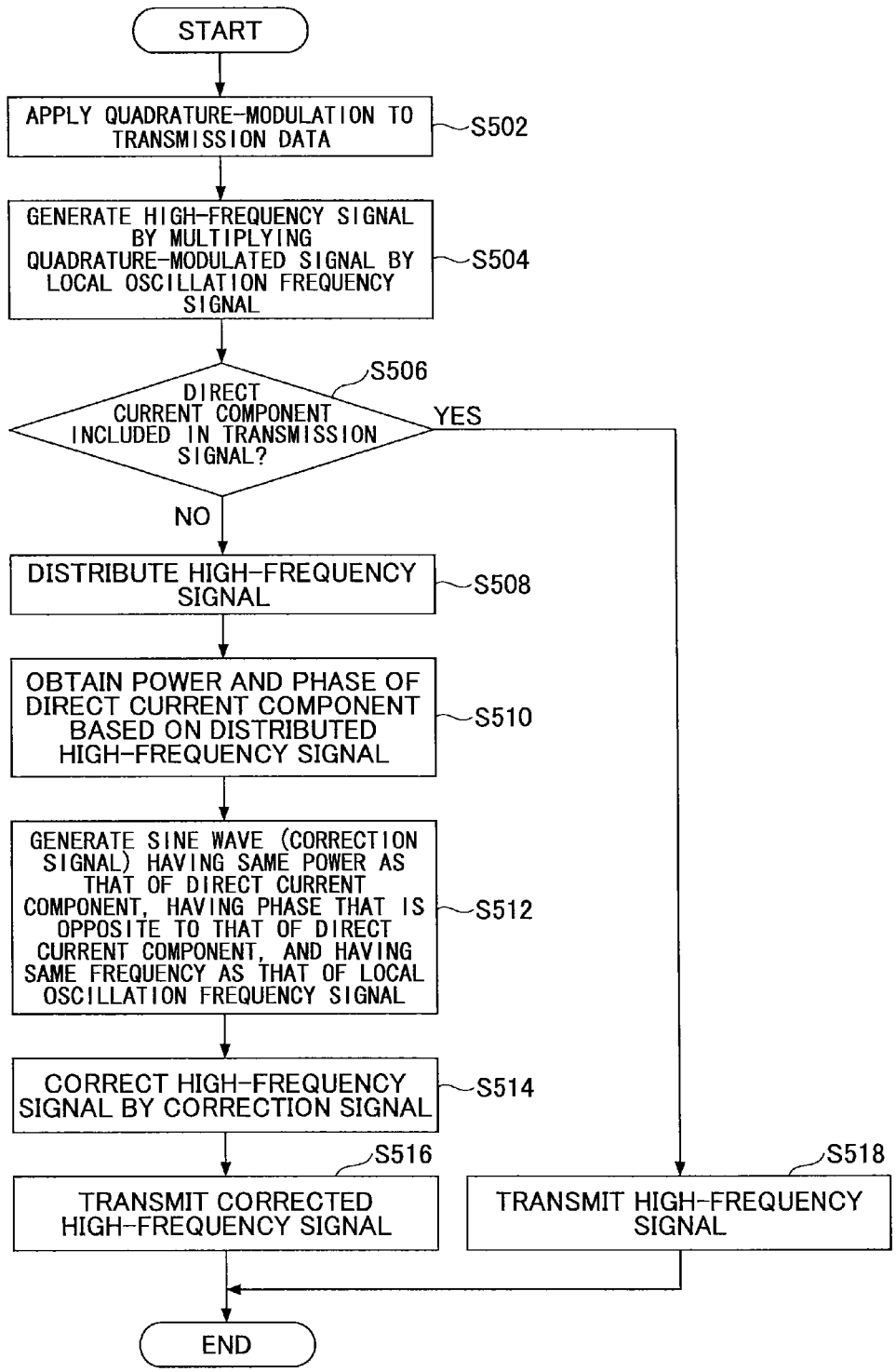
FIG. 5 is a flowchart showing an operation of the wireless communication device according to one embodiment.

FIG. 5 is a flowchart showing operation of the wireless communication device 100.

The wireless device 100 applies the quadrature modulation to the transmission data (step S502). For example, the modulator 1022 applies the quadrature modulation to the transmission data. The transmission data may include an I-component and a Q-component of a digital signal. The modulator 1022 outputs the I-component modulated signal and the Q-component modulated signal.

The wireless communication device 100 multiplies the quadrature-modulated transmission data by the local oscillation frequency signal, and thereby generating the high-frequency signal (step S504). For example, the mixer 1028 multiplies the I-component analog signal with the local oscillation frequency signal. Here, the I-component analog signal is formed by converting the I-component modulated signal into the analog signal and bandwidth-limiting the analog signal. Further, the mixer 1028 multiplies the Q-component analog signal by the local oscillation frequency signal. Here, the local oscillation frequency signal is generated by phase-shifting the phase of the local oscillation frequency signal by 90 degrees. The Q-component analog signal is formed by converting the Q-component modulated signal into the analog signal and bandwidth-limiting the analog signal. The mixer 1028 subtracts the Q-component analog signal, which has been multiplied by the local oscillation frequency signal, from the I-component analog signal, which has been multiplied by the local oscillation frequency signal. As described above, the signal obtained by subtracting the the Q-component analog signal, which has been multiplied by the local oscillation frequency signal whose phase has been shifted by 90 degrees, from the I-component analog signal, which has been multiplied by the local oscillation frequency signal, is referred to as the high-frequency signal.

The wireless communication device 100 determines whether the transmission signal includes the direct current component (step S506). For example, the control unit 110 determines whether the transmission signal includes the direct current component. The control unit 110 may determine whether the transmission signal includes the direct current component, for example, based on whether the direct current component is generated during the digital signal processing. Alternatively, the control unit 110 may determine whether the transmission signal includes the direct current component, based on whether the direct current component is generated, when the transmission signal is averaged.

When it is determined that the transmission signal does not include the direct current component (step S506: NO), the wireless communication device 100 distributes the high-frequency signals (step S508). For example, the distributor 1030 distributes the high-frequency signal as two signals.

The wireless communication device 100 obtains the power and the phase of the direct current component (step S510), based on the distributed signal (high-frequency signal), which has been distributed at step S508. For example, the detector circuit 1038 down-converts the high-frequency signal based on the local oscillation frequency signal, and detects the power and the phase of the direct current component.

The wireless communication device 100 generates a sine wave (the correction signal) having the same power as that of the direct current component, having the opposite phase that is opposite to the phase of the direct component, and having the same frequency as that of the local oscillation frequency signal (step S512). For example, the correction circuit 1040 generates the sine wave (the correction signal) having the same power as that of the direct current component, having the phase that is opposite to the phase of the direct component, and having the same frequency as that of the local oscillation frequency signal, based on the power and the phase of the direct current component input from the detector circuit 1038.

The wireless communication device 100 corrects the high-frequency signal by the correction signal (step S514). For example, the adder 1032 adds the correction signal input from the correction circuit 1040 to the other distributed signal (the high-frequency signal) input from the distributor 1030.

The wireless communication device 100 transmits the high-frequency signal corrected by the correction signal (step S516). The high-frequency signal, to which the correction signal is added (synthesized) by the adder 1032, is amplified by the power amplifier 104, and transmitted through the antenna 108.

When it is determined, by step S506, that the transmission signal includes the direct current component (step S506: YES), the wireless communication device 100 transmits the high-frequency signal (step S518). The high-frequency signal output from the mixer 1028 is power-amplified by the power amplifier 104, and transmitted through the antenna 108. This is because, when it is determined that the transmission signal includes direct current component, the control unit 110 causes the distributor 1030, the detector circuit 1038, and the correction circuit 1040 not to operate.

According to the wireless communication device, the direct current component can be removed from the high-frequency signal. Here, the high-frequency signal has a radio frequency, and is formed by frequency-converting the quadrature-modulated transmission data. The direct current component is generated based on the high-frequency signal. Since the direct current component can be removed from the high-frequency signal, even if the wireless communication device includes a circuit in which the in-phase component and the quadrature component are not perfectly orthogonal to each other, the direct current component can be removed. Further, since the direct current component can be removed, generation of signals generated by the intermodulations between the direct current component and the desired frequency components, and by the intermodulations between the direct current component and spurious radiation components can be reduced.

First Modified Example

Wireless Communication Device

Figure 6:
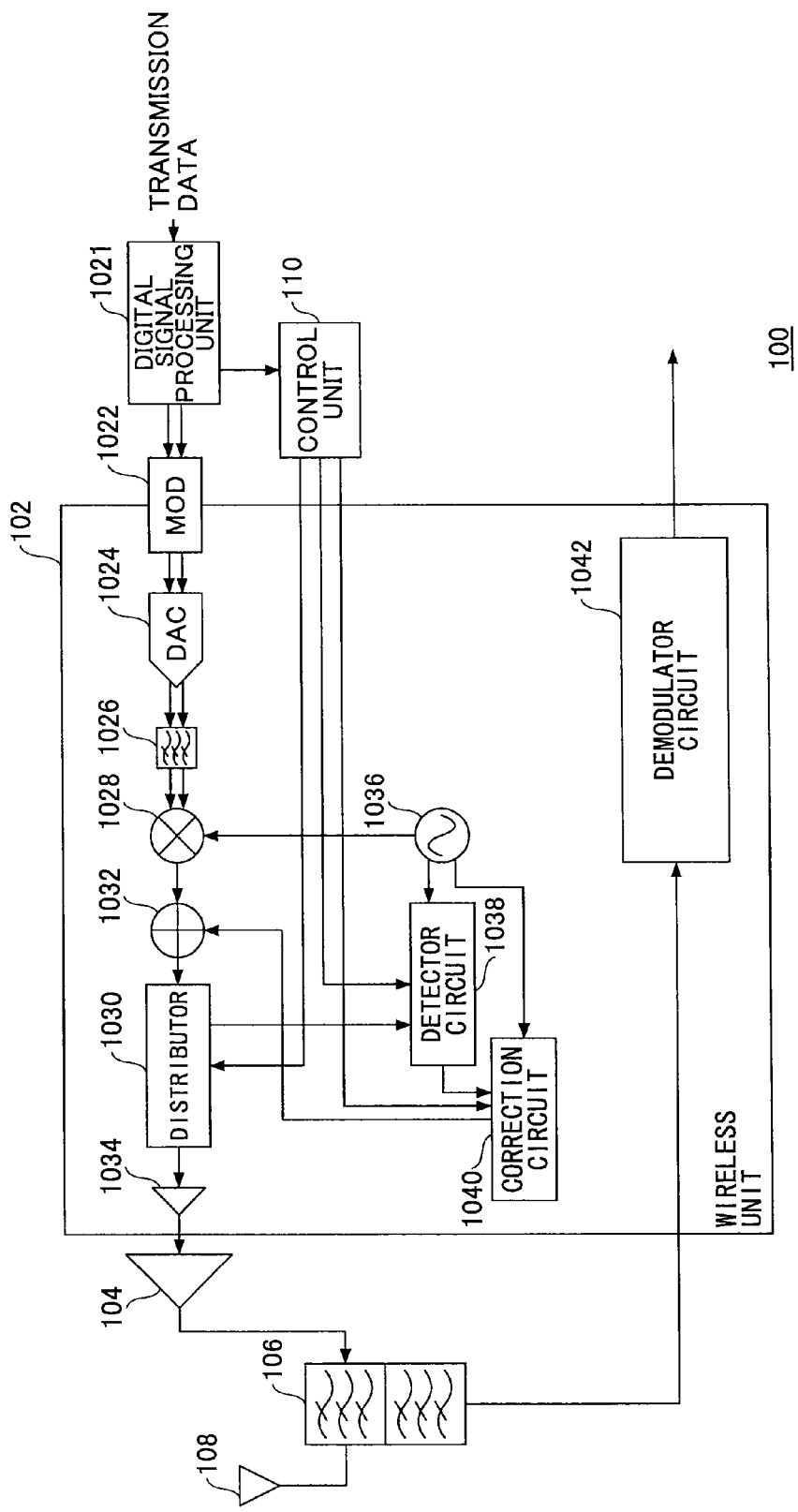
FIG. 6 is a functional block diagram showing functional blocks of a wireless communication device according to one embodiment.

FIG. 6 is a diagram showing a wireless communication device 100 according to an embodiment. In FIG. 6, a configuration of a radio unit is mainly shown.

The wireless communication device 100 according to the embodiment is such that, in the wireless communication device 100 which has been explained by referring to FIG. 3, a high-frequency signal output from the mixer 1028 is input to the adder 1032. Further, an output signal from the adder 1032 is input to the distributor 1030, and the output signal is distributed by the distributor 1030 as plural signals.

<Operation of Wireless Communication Device>

Figure 7:
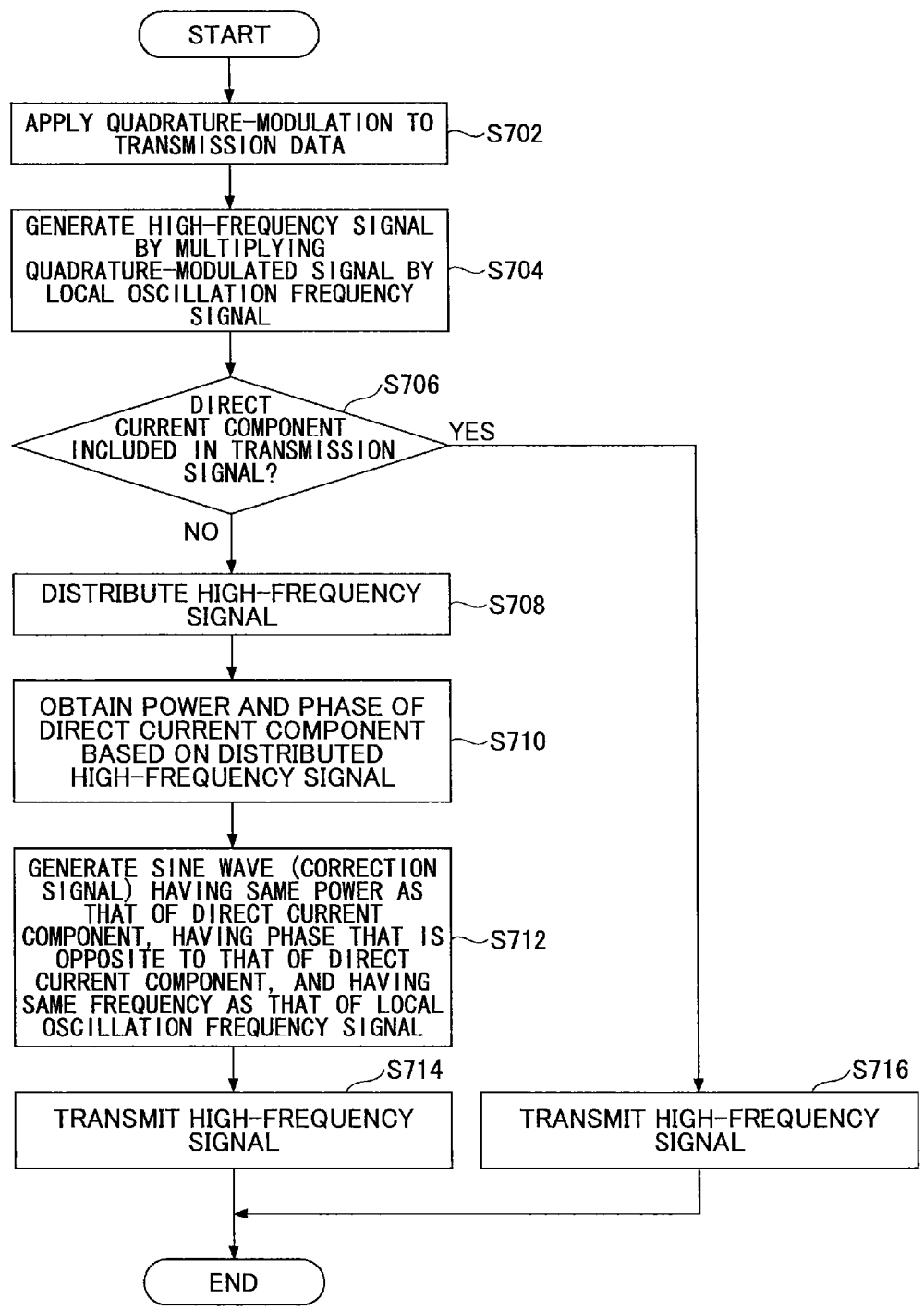
FIG. 7 is a flowchart (version 1) showing an operation of the wireless communication device according to one embodiment.
Figure 8:
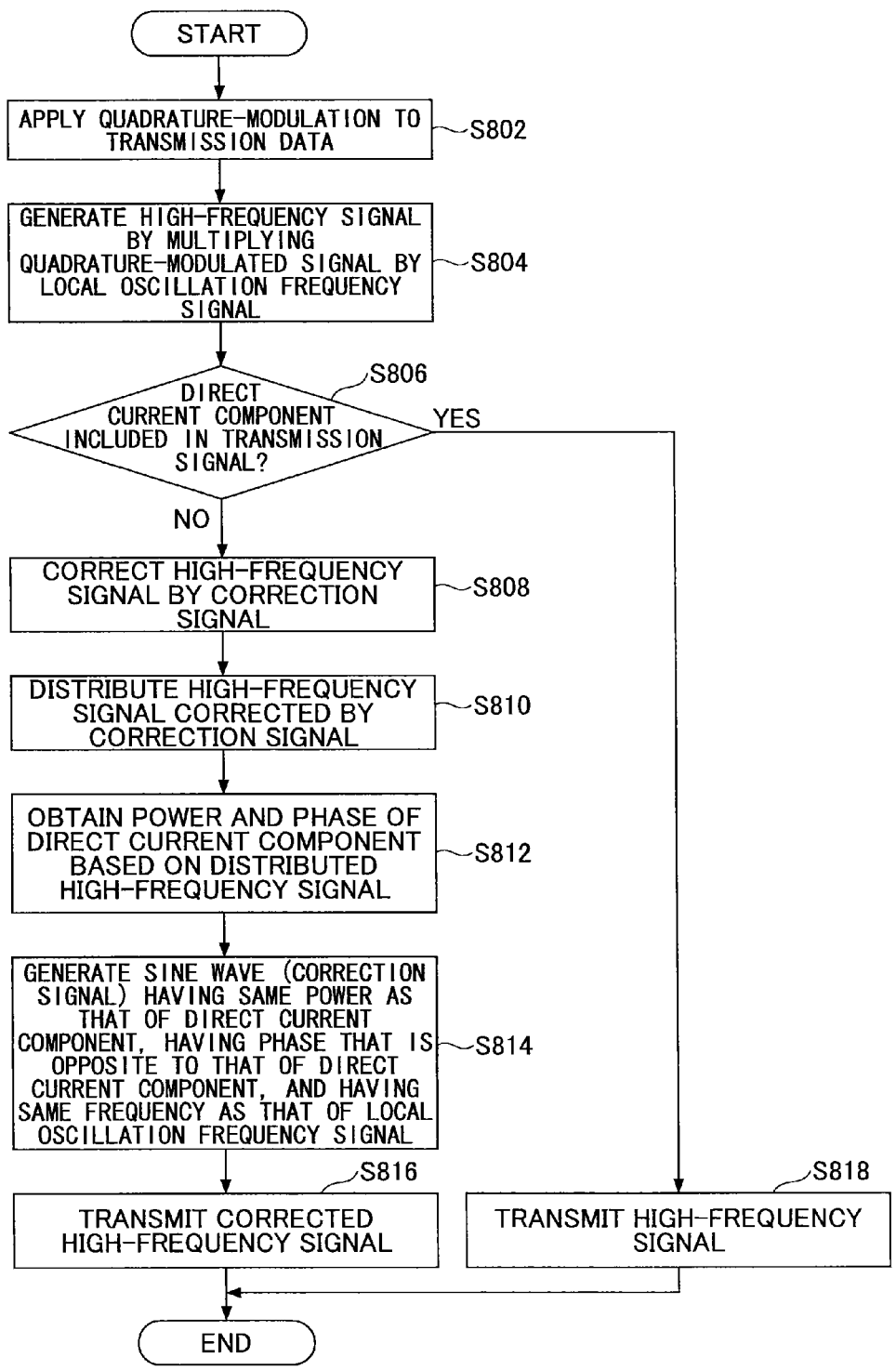
FIG. 8 is a flowchart (version 2) showing an operation of the wireless communication device according one embodiment.

FIGS. 7 and 8 are flowcharts showing operations of the wireless communication device 100.

FIG. 7 shows operations of the wireless communication device 100, immediately after the wireless communication device 100 starts wireless transmission. FIG. 8 shows operations, when a certain amount of time has passed from the start of the wireless transmission by the wireless communication device 100. The certain amount of time may be one period in which the high-frequency signal is corrected by a correction signal.

The operations of the wireless communication device 100 immediately after the start of the wireless transmission are explained.

In FIG. 7, processes from step S702 to step S706 are the same as those of from step S502 to step S506, which have been explained by referring to FIG. 5.

The processes after step S708 are explained.

The wireless communication device 100 distributes the high-frequency signal (step S708). For example, the distributor 1030 distributes the high-frequency signal as two signals. The output signal of the mixer 1028 is input to the adder 1032, but the correction signal is not input to the adder 1032 immediately after the start of the wireless transmission. Therefore, the high-frequency signal is input to the distributor 1030.

The wireless communication device 100 obtains power and a phase of a direct current component (step S710), based on the distributed signal (the high-frequency signal) which has been distributed by step S708. For example, the detector circuit 1038 down-converts the high-frequency signal based on a local oscillation frequency signal, and detects the power and the phase of the direct current component.

The wireless communication device 100 generates a sine wave (the correction signal) having the same power as that of the direct current component, having the phase that is opposite to the phase of the direct component, and having the same frequency as that of the local oscillation frequency signal (step S712). For example, the correction circuit 1040 generates the sine wave (the correction signal) having the same power as that of the direct current component, having the phase that is opposite to the phase of the direct component, and having the same frequency as that of the local oscillation frequency signal, based on the power and the phase of the direct current component input from the detector circuit 1038.

The wireless communication device 100 transmits the other distributed signal (high-frequency signal) distributed at step S708 (step S716). The other distributed signal (the high-frequency signal) output from the distributor 1030 is power-amplified by the power-amplifier 104, and transmitted from the antenna 108.

When it is determined, by step S706, that the transmission signal includes the direct current component (step S706: YES), the wireless communication device 100 transmits the high-frequency signal (step S716). The high-frequency signal output from the mixer 1028 is power-amplified by the power-amplifier 104, and transmitted through the antenna 108. When it is determined that the transmission signal includes direct current component, the control unit 110 causes the distributor 1030, the detector circuit 1038, and the correction circuit 1040 not to operate.

Next, the operations of the wireless communication device 100, after a certain amount of time has been passed, are explained.

In FIG. 8, the processes from step S802 to step S806 are the same as those of from step S502 to step S506, which have been explained by referring to FIG. 5.

When it is determined that the transmission signal does not include the direct current component (step S806: NO), the high-frequency signal is corrected by the correction signal (step S808). For example, the adder 1032 adds the correction signal input from the correction circuit 1040 to the high-frequency signal. Immediately after the flow shown in FIG. 7, the correction signal utilized for the adding process may be the correction signal generated by the step S712 of FIG. 7.

The wireless communication device 100 distributes the high-frequency signal that has been corrected by the correction signal by step S808. For example, the distributor 1030 distributes the high-frequency signal that has been corrected by the correction signal input from the adder 1032 as two signals.

The wireless communication device 100 obtains the power and the phase of the direct current component (step S812), based on the distributed signal (the high-frequency signal), which has been distributed at step S810. For example, the detector circuit 1038 detects the power and the phase of the direct current component of the high-frequency signal, based on the local oscillation frequency signal.

The wireless communication device 100 generates the sine wave (the correction signal) having the same power as that of the direct current component, having the phase that is opposite to the phase of the direct component, and having the same frequency as that of the local oscillation frequency signal (step S814). For example, the correction circuit 1040 generates the sine wave having the same power as that of the direct current component, having the phase that is opposite to the phase of the direct component, and having the same frequency as that of the local oscillation frequency signal, based on the power and the phase of the direct current component of the high-frequency signal input from the detector circuit 1038.

The wireless communication device 100 transmits the high-frequency signal, which has been corrected by the correction signal (step S816). The other distributed signal (the high-frequency signal) distributed by the distributor 1030 is power-amplified by the power-amplifier 104, and transmitted through the antenna 108.

When it is determined, by step S806, that the transmission signal includes the direct current component (step S806: YES), the wireless communication device 100 transmits the high-frequency signal (step S818). The high-frequency signal outputs from the mixer 1028 is power-amplified by the power-amplifier 104, and is transmitted through the antenna 108. This is because, when it is determined that the transmission signal does not include any direct current component, the controller 110 causes the distributor 1030, the detector circuit 1038, and the correction circuit 1040 not to operate.

Immediately after and following the flow shown in FIG. 8, as the correction signal utilized for the adding process at step S808, the correction signal generated at step S814 is utilized.

According to the wireless communication device, the direct current component can be removed from the high-frequency signal. The high-frequency signal has been formed by frequency-converting the quadrature-modulated transmission data into a signal having a radio frequency. The direct current component is generated based on the high-frequency signal, in which the direct current component has been reduced by the correction signal. Since the direct current component is generated based on the high-frequency signal, in which the direct current component has been reduced by the correction signal, the direct current component can further be reduced. Further, it is possible that, during the wireless transmission, temperature of an element is changed and thereby the characteristic of the element is changed. However, even if the characteristic of the element is changed, the direct current component generated by the change of the characteristic can be removed at any time.

Since the direct current component can be removed from the high-frequency signal, even if the wireless communication device includes a circuit in which the in-phase component and the quadrature component are not perfectly orthogonal to each other, the direct current component generated by the circuit can be removed. Further, since the direct current component can be removed, generation of signals generated by the intermodulations between the direct current component and the desired frequency components, and signals generated by the intermodulations between the direct current component and spurious radiation components can be reduced.

Second Modified Example

Wireless Communication Device

Figure 9:
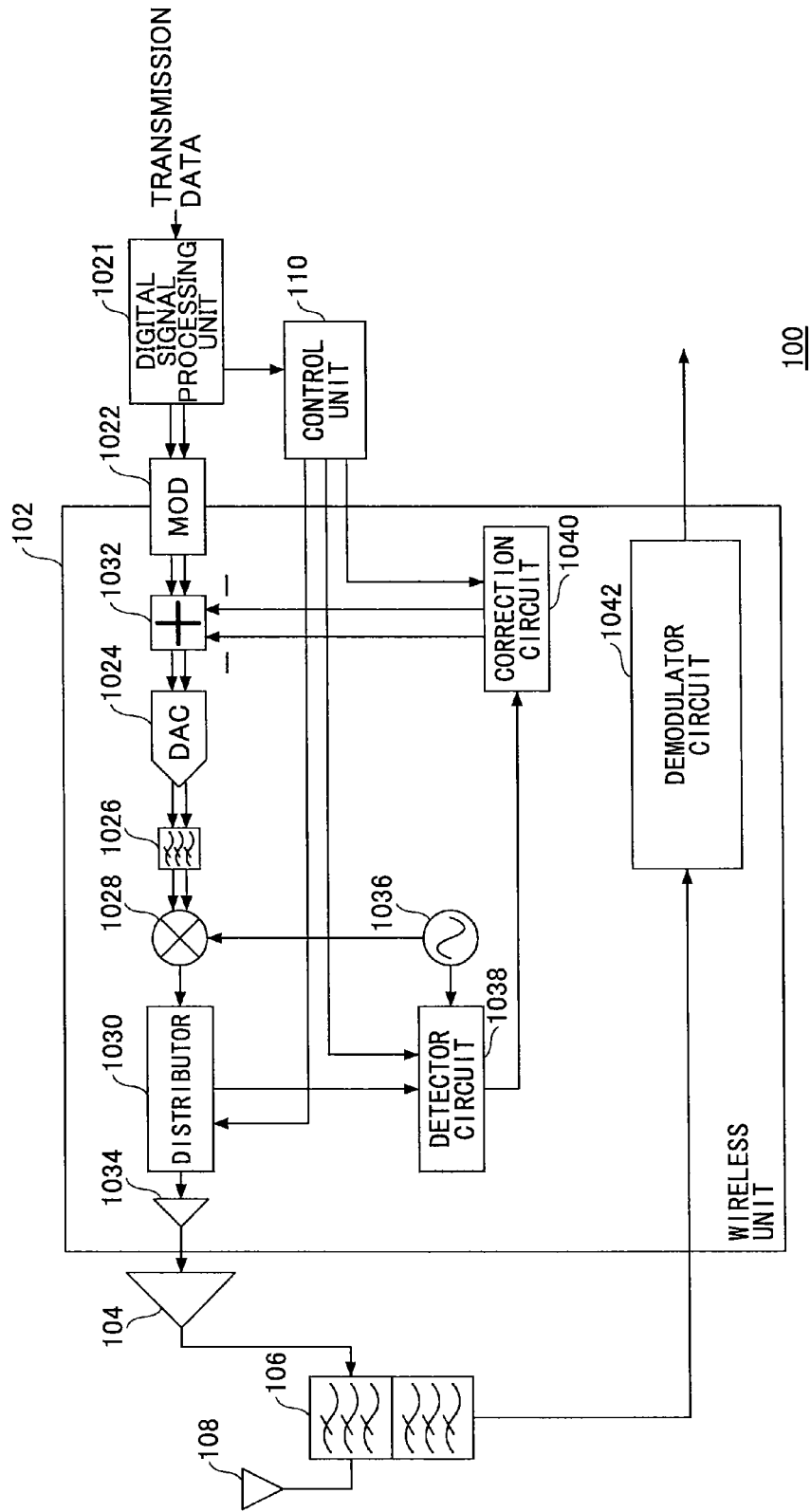
FIG. 9 is a functional block diagram showing functional blocks of a wireless communication device according to one embodiment.

FIG. 9 shows a wireless communication device 100 according to an embodiment. In FIG. 9, a configuration of a radio unit is mainly shown.

The wireless communication device 100 according to the embodiment is such that, in the wireless communication device 100 which has been explained by referring to FIG. 3, modulated signals output from the modulator 1022 is input to the adder 1032. Further, an output signal from the adder 1032 is input to the digital-to-analog convertor 1024.

The detector circuit 1038 detects a direct current component of a high-frequency signal based on a local oscillation frequency signal input from the local oscillator 1036. For example, the detector circuit 1038 restores an original signal from the high-frequency signal input from the distributor 1030. The original signal means a signal corresponding to the signals output from the filter 1026. In other words, the detector circuit 1038 down-converts the high-frequency signal. The detector circuit 1038 detects power of the direct current component of the high-frequency signal, based on the down-converted high-frequency signal. The direct current component is generated, when the modulated signals are multiplied by the local oscillation frequency signal. The direct current component can be detected by down-converting the high-frequency signal from the mixer 1028 into the modulated signal. The detector circuit 1038 inputs the power of the direct current component in the high-frequency signal to the correction circuit 1040.

The correction circuit 1040 is connected to the detector circuit 1038. The detector circuit 1038 inputs the power of the direct current component in the high-frequency signal to the correction circuit 1040. The correction circuit 1040 generates an I-component of a modulated signal and a Q-component of the modulated signal, which indicate the same power as the power of the direct current component, based on the power of the direct current component in the high-frequency signal input from the detector circuit 1038. The I-component of the modulated signal and the Q-component of the modulated signal are referred to as the "I-component correction signal" and the "Q-component correction signal," respectively. The correction circuit 1040 inputs the I-component correction signal and the Q-component correction signal to the adder 1032.

The adder 1032 is connected to the modulator 1022, to the correction circuit 1040, and to the digital-to-analog convertor 1024. The adder 1032 adds a signal which is generated by inverting the I-component correction signal input from the correction circuit 1040 to the I-component modulated signal input from the modulator 1022. Further, the adder 1032 adds a signal which is generated by inverting the Q-component correction signal input from the correction circuit 1040 to the Q-component modulated signal input from the modulator 1022. By the above adding process, an I-component of the direct current component is removed from the I-component modulated signal, and the Q-component of the direct current component is removed form the Q-component modulated signal. The adder 1032 inputs the signal that is the I-component modulated signal from which the I-component of the direct current component has been removed and the signal that is the Q-component modulated signal from which the Q-component of the direct current component has been removed to the digital-to-analog convertor 1024.

<Operations of Wireless Communication Device>

FIGS. 10 and 11 are flowcharts showing operations of the wireless communication device 100.

FIG. 10 shows operations of the wireless communication device 100, immediately after the wireless communication device 100 starts wireless transmission. FIG. 11 shows operations, after a certain amount of time has passed from the start of the wireless transmission by the wireless communication device 100. The certain amount of time may be one period in which the high-frequency signal is corrected by a correction signal.

The operations of the wireless communication device 100 immediately after the start of the wireless transmission are explained.

The wireless communication device 100 applies the quadrature modulation to transmission data (step S1002). For example, the modulator 1022 applies the quadrature modulation to the transmission data. The transmission data may includes an I-component of a digital signal and a Q-component of the digital signal. The modulator 1022 outputs the I-component modulated signal and the Q-component modulated signal.

The wireless communication device 100 determines whether a direct current component is included in a transmission signal (step S1004). For example, the control unit 110 determines whether the direct current component is included in the transmission signal.

The wireless communication device 100 generates a high-frequency signal by multiplying the quadrature-modulated transmission data by a local oscillation frequency signal (step S1006). For example, the mixer 1028 multiplies an I-component analog signal by the local oscillation frequency signal. The I-component analog signal is generated by converting the I-component modulated signal into an analog signal and bandwidth-limiting the analog signal. Further, the mixer 1028 multiplies a Q-component analog signal by a local oscillation frequency signal, whose phase is shifted by 90 degrees from the phase of the local oscillation frequency signal. The Q-component analog signal is generated by converting the Q-component modulated signal into an analog signal and bandwidth-limiting the analog signal. The mixer 1028 subtracts the Q-component analog signal, which has been multiplied by the local oscillation frequency signal whose phase has been shifted by 90 degrees, from the I-component analog signal, which has been multiplied by the local oscillation frequency signal. As described above, the signal generated by subtracting the Q-component analog signal, which has been multiplied by the local oscillation frequency signal whose phase has been shifted by 90 degrees, from the I-component analog signal, which has been multiplied by the local oscillation frequency signal, is referred to as the high-frequency signal.

The wireless communication device 100 distributes the high-frequency signal (step S1008). For example, the distributor 1030 distributes the high-frequency signal as two signals. The distributed signals are input to the amplifier 1034 and the detector circuit 1038.

The wireless communication device 100 obtains power of the direct current component, based on the distributed signal (the high-frequency signal), which is distributed by step S1008 (step S1010). For example, the detector circuit 1038 down-converts the high-frequency signal based on the local oscillation frequency signal, and detects the power of the direct current component.

The wireless communication device 100 generates an I-component of a modulated signal and a Q-component the modulated signal (step S1012). Here, the I-component of the modulated signal and the Q-component of the modulated signal indicate the same power as that of the direct current component. For example, the correction circuit 1040 generates the I-component of the modulated signal (the I-component correction signal) and the Q-component of the modulated signal (the Q-component correction signal), which indicate the same power as that of the direct current component, based on the power of the direct current component input from the detector circuit 1038.

The wireless communication device 100 transmits the other distributed signal (the high-frequency signal) (step S1014), which has been generated at step S1006. The other distributed signal (the high-frequency signal) output from the distributor 1030 is power-amplified by the power-amplifier 104, and is transmitted through the antenna 108.

When it is determined, by step S1004, that the transmission signal does not include any direct current component (step S1004: YES), the wireless transmission device 100 transmits the high-frequency signal (step S1016). The high-frequency signal output from the mixer 1028 is power-amplified by the power-amplifier 104, and transmitted through the antenna 108. When it is determined that the transmission signal does not include any direct current component, the controller 110 causes the distributor 1030, the detector circuit 1038, and the correction circuit 1040 not to operate.

The operations of the wireless communication device 100, after a certain amount of time has been passed, are explained.

The wireless communication device 100 applies the quadrature modulation to the transmission data (step S1102). For example, the modulator 1022 applies the quadrature modulation to the transmission data. The transmission data may include an I-component and a Q-component of a digital signal. The modulator 1022 outputs an I-component modulated signal and a Q-component modulated signal.

The wireless communication device 100 determines whether the transmission signal includes a direct current component (step S1104). For example, the control unit 110 determines whether the transmission signal includes the direct current component.

When it is determined that the transmission signal does not include the direct current component (step S1104: NO), the wireless communication device 100 corrects the quadrature-modulated transmission data by correction signals (step S1106). For example, the adder 1032 adds the correction signals input from the correction circuit 1040 to the quadrature-modulated transmission data. Specifically, the adder 1032 adds an I-component correction signal output from the correction circuit 1040 to the I-component modulated signal output from the modulator 1022. Further, the adder 1032 adds a Q-component correction signal output from the correction circuit 1040 to the Q-component modulated signal output from the modulator 1022. Immediately after the flow shown in FIG. 10, the I-component correction signal and the Q-component correction signal utilized for the adding process may be those signals generated at step S1012 in FIG. 10.

The wireless communication device 100 generates a high-frequency signal by multiplying the modulated signal by the local oscillation frequency signal (step S1108). Here, the correction signal has been added to the modulated signal. For example, the mixer 1028 multiplies the I-component analog signal by the local oscillation frequency signal. Further, the mixer 1028 multiplies the Q-component analog signal by a local oscillation frequency signal, whose phase is shifted by 90 degrees from that of the local oscillation frequency signal. The mixer 1028 subtracts the Q-component analog signal, which has been multiplied by the local oscillation frequency signal whose phase has been shifted by 90 degrees, from the I-component analog signal, which has been multiplied by the local oscillation frequency signal. As described above, the signal formed by subtracting the Q-component analog signal, which has been multiplied by the local oscillation frequency signal whose phase has been shifted by 90 degrees, from the I-component analog signal, which has been multiplied by the local oscillation frequency signal, is referred to as the "high-frequency signal."

The wireless communication device 100 distributes the high-frequency signal (step S1010). For example, the distributor 1030 distributes the high-frequency signal as two signals.

The wireless communication device 100 determines the power of the direct current component (step S1112), based on the distributed signal (the high-frequency signal) distributed at step S1110. For example, the detector circuit 1038 detects the power and the phase of the direct current component of the modulated signal, based on the local oscillation frequency signal.

The wireless communication device 100 generates an I-component of a modulated signal (the I-component correction signal) and a Q-component of the modulated signal (the Q-component correction signal) (step S1114). The I-component of the modulated signal and the Q-component of the modulated signal indicate the same power as that of the direct current component. For example, the correction circuit 1040 generates the I-component of the modulated signal (the I-component correction signal) and the Q-component of the modulated signal (the Q-component correction signal), which indicate the same power as that of the direct current component, based on the power of the direct current component of the modulated signal input from the detector circuit 1038.

The wireless communication device 100 transmits the other distributed signal (the high-frequency signal) (step S1116), which has been distributed by step S1110. The high-frequency signal output from the mixer 1028 is power-amplified by the power-amplifier 104, and transmitted through the antenna 108.

When it is determined, by step S1104, that the transmission signal includes the direct current component (step S1104: YES), the wireless communication device 100 generates the high-frequency signal by multiplying the quadrature-modulated transmission data by the local oscillation frequency signal (step S1118). For example, the mixer 1028 multiplies the I-component analog signal by the local oscillation frequency signal. Further, the mixer 1028 multiplies the Q-component analog signal with a local oscillation frequency signal, whose phase is shifted by 90 degrees from the phase of the local oscillation frequency signal. The mixer 1028 subtracts the Q-component analog signal, which has been multiplied by the local oscillation frequency signal whose phase has been shifted by 90 degrees, from the I-component analog signal, which has been multiplied by the local oscillation frequency signal. As described above, the signal generated by subtracting the Q-component analog signal, which has been multiplied by the local oscillation frequency signal whose phase has been shifted by 90 degrees, from the I-component analog signal, which has been multiplied by the local oscillation frequency signal, is referred to as the "high-frequency signal."

The wireless communication device 100 transmits the high-frequency signal (step S1120). The high-frequency signal output from the distributor 1030 is power-amplified by the power-amplifier 104, and transmitted through the antenna 108. This is because, when it is determined that the transmission signal does not include the direct current component, the controller 110 causes the distributor 1030, the detector circuit 1038, and the correction circuit 1040 not to operate.

Subsequently to the flow of FIG. 10, except for immediately after the flow of FIG. 10, as the I-component correction signal and the Q-component correction signal, the I-component correction signal and the Q-component correction signal which have been generated at step S1114 are utilized for the adding process of step S1106.

According to the wireless communication device, the direct current component can be removed from the high-frequency signal. The high-frequency signal is generated by frequency-converting the quadrature-modulated transmission data into a signal having a radio frequency. The direct current component is generated based on the high-frequency signal, which has been generated by up-converting the modulated signal. Here, the direct current component of the modulated signal has been reduced by the correction signals. Since the direct current component can be generated based on the high-frequency signal generated by up-converting the modulated signal, in which the direct current component has been reduced by the correction signals, the direct current component can further be reduced. Further, it is possible that, when the wireless transmission is performed, the temperature of an element is changed, and thereby the characteristic of the element is changed. However, even if the characteristic of the element is changed, the direct current component generated by the change of the characteristic can be removed.

Since the direct current component can be removed from the high-frequency signal, even if the wireless communication device includes a circuit in which the in-phase component and the quadrature component are not perfectly orthogonal to each other, the direct current component generated by the circuit can be removed. Further, since the direct current component can be removed, generation of signals generated by the intermodulations between the direct current component and the desired frequency components, and generation of signals generated by the intermodulations between the direct current component and spurious radiation components can be reduced.

In the above described embodiments, the digital signal processing unit 1021 can be provided between the digital-to-analog convertor 1024 and the modulator 1022. In other words, the digital signal processing unit 1021 can be arranged at any position, provided that the signal processed by the digital signal processing unit 1021 is input to the digital-to-analog convertor 1024.

With respect to the embodiment including the above embodiments, the following items are disclosed.

(1) Including a mixer that multiplies quadrature-modulated transmission data with a local oscillation frequency signal and outputs a high-frequency signal; a distributor that distributes the high-frequency signal; a detector circuit that detects a direct current component included in the high-frequency signal, based on the high-frequency signal distributed by the distributor; a correction signal generating unit as a correction circuit that generates a correction signal for removing the direct current component from the high-frequency signal, based on the direct current component detected by the detector circuit; a correction unit as an adder that corrects the high-frequency signal by the correction signal generated by the correction signal generating unit; and a transmission unit that transmits the high-frequency signal corrected by the correction unit.

The direct current component of the distributed high-frequency signal, which has been distributed by the distributor, is detected, and the correction signal for removing the direct current component from the high-frequency signal is generated, based on the detected direct current component. By removing the generated correction signal from the high-frequency signal, the direct current component can be removed from the high-frequency signal. For example, the power and the phase of the direct current component of the high-frequency signal are detected, and, based on the detected power and phase of the direct current component, a sine wave having the same power as that of the direct current component and having a phase that is opposite to the phase is generated. By removing the sine wave from the high-frequency signal, the direct current component can be removed from the high-frequency signal.

(2) In the wireless communication device described in (1), the correction unit corrects the high-frequency signal to be output from the distributor by a correction signal to be generated by the correction signal generating unit.

With this configuration, the direct current component can be removed from the high-frequency signal to be output from the distributor.

(3) In the wireless communication device described in (1), the correction unit corrects a high-frequency signal output from the mixer by a correction signal to be generated by the correction signal generating unit, and the distributor distributes the high-frequency signal that has been corrected by the correction unit.

With this configuration, a direct current component can be removed from the high-frequency signal output from the mixer. Here, the direct current component is detected based on the high-frequency signal from which the direct current component has been removed.

(4) In the wireless communication device described in (1), the correction unit corrects the quadrature-modulated transmission data by a correction signal to be generated by the correction signal generating unit, and the mixer multiplies the transmission data that has been corrected by the correction unit by the local oscillation frequency signal, and outputs a third high-frequency signal.

With this configuration, a direct current component can be removed from the quadrature-modulated transmission data. Here, the direct current component is generated based on a high-frequency signal that is generated by frequency-converting a modulated signal from which a direct current component has been removed.

(5) Including a high-frequency signal generating step of generating a high-frequency signal by multiplying quadrature-modulated transmission data by a local oscillation frequency signal; a distributing step of distributing the high-frequency signal; a detection step of detecting a direct current component included in the high-frequency signal, based on the high-frequency signal distributed by the distributing step; a correction signal generating step of generating a correction signal for removing the direct current component from the high-frequency signal, based on the direct current component detected by the detection step; a correction step of correcting the high-frequency signal by the correction signal generated by the correction signal generating step; and a transmission step of transmitting the high-frequency signal corrected by the correction step.

For convenience of the explanations, specific numerals have been used in the description in order to facilitate understandings of the present invention. However, these numerals are simply illustrative, and any other appropriate value may be used, except indicated otherwise.

Although the present invention has been described with reference to specific embodiments, these embodiments are simply illustrative, and various variations, modifications, alterations, substitutions and so on could be conceived by those skilled in the art. For convenience of the explanations, devices according to the embodiments of the present invention have been described by using functional block diagrams, but the devices may be implemented in hardware, software or combinations thereof. The present invention is not limited to the above-described embodiments, and various variations, modifications, alterations, substitutions and so on are included, without departing from the spirit of the present invention.

This international patent application is based on Japanese Priority Application No. 2010-003033 filed on Jan. 8, 2010, the entire contents of which are hereby incorporated by reference.

LIST OF REFERENCE SYMBOLS

100: Wireless Communication Device
102: Radio Unit
104: Power Amplifier
106: Duplexer
108: Antenna
110: Control Unit
1021: Digital Signal Processing Unit
1022: Modulator (MOD)
1024: Digital-to-analog Convertor
1026: Filter
1028: Mixer
10282: Multiplication Unit
10284: Phase Shift Unit
10286: Multiplication Unit
10288: Adder
1030: Distributor
1032: Adder
1034: Amplifier
1036: Local Oscillator
1038: Detector Circuit
1040: Correction Circuit
1042: Demodulator Circuit

The invention claimed is:

1. A wireless communication device comprising:
   a mixer configured to multiply quadrature-modulated transmission data by a local oscillation frequency signal and output a high-frequency signal;
   a distributor configured to distribute the high-frequency signal;
   a detector circuit configured to detect a high-frequency direct current component included in the high-frequency signal, based on the high-frequency signal distributed by the distributor;
   a correction circuit configured to generate a correction signal for removing the high frequency direct current component from the high-frequency signal, based on the high frequency direct current component detected by the detector circuit;
   an adder configured to correct the high-frequency signal by the correction signal generated by the correction circuit;
   a controller configured to determine whether the quadrature-modulated transmission data includes a direct current component; and
   a transmission unit that transmits the high-frequency signal that has been corrected by the adder,
   wherein, when the controller determines that the quadrature-modulated transmission data does not include the direct current component, the controller causes the adder to correct the high-frequency signal by the correction signal generated by the correction circuit.

2. The wireless communication device according to claim 1,
   wherein the adder corrects the high-frequency signal output from the distributor by the correction signal to be generated by the correction circuit.

3. The wireless communication device according to claim 1,
   wherein the adder corrects the high-frequency signal output from the mixer by the correction signal to be generated by the correction circuit, and
   wherein the distributor distributes the high-frequency signal that has been corrected by the adder.

4. The wireless communication device according to claim 1,
   wherein the adder corrects the quadrature-modulated transmission data by the correction signal to be generated by the correction circuit, and
   wherein the mixer multiplies the quadrature-modulated transmission data that has been corrected by the adder by the local oscillation frequency signal, and outputs the high-frequency signal.

5. A wireless communication method for a wireless communication device, the wireless communication method comprising:
   generating a high-frequency signal by multiplying quadrature-modulated transmission data by a local oscillation frequency signal;
   distributing the high-frequency signal;
   detecting a high-frequency direct current component included in the high-frequency signal, based on the high-frequency signal distributed by the distributing;
   generating a correction signal for removing the high-frequency direct current component from the high-frequency signal, based on the high-frequency direct current component detected by the detection step;
   correcting the high-frequency signal by the correction signal generated by the correction signal generating step;
   determining whether the quadrature-modulated transmission data includes a direct current component; and
   transmitting the high-frequency signal that has been corrected by the correcting,
   wherein, when the determining determines that the quadrature-modulated transmission data does not include the direct current component, the determining causes the correcting to correct the high-frequency signal by the correction signal generated by the generating.

* * * * *

UNITED STATES PATENT AND TRADEMARK OFFICE
CERTIFICATE OF CORRECTION

| | | |
|---|---|---|
| PATENT NO. | : 8,861,641 B2 | Page 1 of 1 |
| APPLICATION NO. | : 13/520941 | |
| DATED | : October 14, 2014 | |
| INVENTOR(S) | : Shinya Oka et al. | |

It is certified that error appears in the above-identified patent and that said Letters Patent is hereby corrected as shown below:

On the title page, Item (75), the 1st Inventor's City of Residence is incorrect. Item (75) should read:

--(75) Inventors: Shinya Oka, Yokosuka (JP);
                Takashi Okada, Yokohama (JP)--

On the title page, Item (73), the Assignee's Information is incorrect. Item (73) should read:

--(73) Assignee: NTT DOCOMO, INC., Tokyo (JP)--

Signed and Sealed this
Twentieth Day of January, 2015

Michelle K. Lee
*Deputy Director of the United States Patent and Trademark Office*